(12) United States Patent
Zhang et al.

(10) Patent No.: US 9,581,840 B2
(45) Date of Patent: Feb. 28, 2017

(54) LIQUID CRYSTAL DISPLAY SCREEN DETECTING DEVICE

(71) Applicants: BOE TECHNOLOGY GROUP CO., LTD., Beijing (CN); BOE (HEBEI) MOBILE DISPLAY TECHNOLOGY CO., LTD., Gu'An, Hebei (CN)

(72) Inventors: Chunhua Zhang, Beijing (CN); Gang Li, Beijing (CN); Jian Li, Beijing (CN); Yongjun Liao, Beijing (CN); Hongqiang Fan, Beijing (CN); Maojia Wang, Beijing (CN); Meng Li, Beijing (CN)

(73) Assignees: BOE TECHNOLOGY GROUP CO., LTD., Beijing (CN); BOE (HEBEI) MOBILE DISPLAY TECHNOLOGY CO., LTD., Gu'An, Hebei (CN)

( * ) Notice: Subject to any disclaimer, the term of this patent is extended or adjusted under 35 U.S.C. 154(b) by 0 days.

(21) Appl. No.: 14/791,565

(22) Filed: Jul. 6, 2015

(65) Prior Publication Data
US 2016/0202509 A1    Jul. 14, 2016

(30) Foreign Application Priority Data

Jan. 13, 2015 (CN) .......................... 2015 1 0017341

(51) Int. Cl.
*B65G 21/20* (2006.01)
*G02F 1/13* (2006.01)
(Continued)

(52) U.S. Cl.
CPC .......... *G02F 1/1303* (2013.01); *B65G 15/12* (2013.01); *B65G 15/64* (2013.01);
(Continued)

(58) Field of Classification Search
CPC  B65G 13/12; B65G 2249/00; B65G 2249/02; B65G 37/005; B65G 21/20; B65G 17/002; B65G 21/2027
(Continued)

(56) References Cited

U.S. PATENT DOCUMENTS 6,705,001 B2 * 3/2004 How ................. H01L 21/67236
198/586
2003/0097748 A1    5/2003 How et al.
(Continued)

FOREIGN PATENT DOCUMENTS

| CN | 101842301 A | 9/2010 |
|---|---|---|
| CN | 102897535 A | 1/2013 |
| CN | 103017652 A | 4/2013 |

OTHER PUBLICATIONS

First Chinese Office Action dated Oct. 31, 2016; Appln. No. 201510017341.4.

*Primary Examiner* — James R Bidwell
(74) *Attorney, Agent, or Firm* — Ladas & Parry LLP

(57) ABSTRACT

A liquid crystal display screen detecting device is provided. The liquid crystal display screen detecting device comprises: a supporting unit configured to have two opposed support frames; a conveying unit configured to carry a liquid crystal display screen to be detected and move on the support frames; a driving unit configured to drive the conveying unit; and a detecting unit configured to detect the liquid crystal display screen to be detected.

18 Claims, 3 Drawing Sheets

(51) Int. Cl.
*B65G 15/12* (2006.01)
*B65G 15/64* (2006.01)
*H04N 7/18* (2006.01)
*G09G 3/00* (2006.01)

(52) U.S. Cl.
CPC ........... *B65G 21/2027* (2013.01); *H04N 7/18* (2013.01); *G09G 3/006* (2013.01)

(58) Field of Classification Search
USPC .................................. 198/817, 465.3, 860.1
See application file for complete search history.

(56) References Cited

U.S. PATENT DOCUMENTS

| | | | |
|---|---|---|---|
| 2010/0230237 A1* | 9/2010 | Niewiera ............. | B65G 49/064 198/373 |
| 2014/0102852 A1* | 4/2014 | Wang ................... | B65G 13/075 198/463.4 |
| 2015/0068867 A1* | 3/2015 | Nishimura ........ | H01L 21/67706 198/373 |

* cited by examiner

LIQUID CRYSTAL DISPLAY SCREEN DETECTING DEVICE

TECHNICAL FIELD

Embodiments of the invention relate to a liquid crystal display screen detecting device.

BACKGROUND

It is known that, both upper and lower sides of a liquid crystal display screen are required to be detected when the liquid crystal display screen is detected. Generally, the liquid crystal display screen to be detected is operated by a mechanical hand with a suction nozzle, then the liquid crystal display screen to be detected is checked; if the liquid crystal display screen on a suction nozzle side is to be detected without a detection blind zone, the liquid crystal display screen should be further suctioned and lifted from the other side. However, these actions of the mechanical hand such as suctioning and lifting, moving and laying down and so on can cause physical damage to the liquid crystal display screen, resulting in poor product; and the maintenance workload for the mechanical hand itself and its ancillary equipment is heavy; in addition, if both sides of the liquid crystal display screen are detected at one time, the suctioned region cannot be detected, resulting in a detection blind zone.

SUMMARY

Embodiments of the present invention provide a liquid crystal display screen detecting device, in order to improve efficiency of appearance detection, prevent damage to the liquid crystal display screen, reduce a detection blind zone, and perform detection on both sides simultaneously.

At least one embodiment of the present invention provides a liquid crystal display screen detecting device, comprising:

a supporting unit having two opposed support frames;

a conveying unit configured to carry a liquid crystal display screen to be detected and move on the support frames;

a driving unit configured to drive the conveying unit; and a detecting unit configured to detect the liquid crystal display screen to be detected.

For example, the support frame comprises a bearing part and a supporting part, the bearing part being configured to move the liquid crystal display screen to be detected, which is carried by the conveying unit, from one terminal to the other terminal of the bearing part, and the supporting part being configured to support the bearing part.

The bearing parts of the two opposed support frames comprise top terminal faces in contact with the conveying unit, the top terminal faces being disposed on a same horizontal plane; or, the bearing parts of the two opposed support frames comprise top terminal faces in contact with the conveying unit, the top terminal faces being tilted towards a space between the two opposed support frames.

For example, the supporting parts of the two opposed support frames are tilted towards the space between the two opposed support frames.

For example, the supporting unit is movably fixed on a base plate; and a distance between the two opposed support frames of the supporting unit is adjustable.

For example, a right-hand and left-hand lead screw is arranged between the two opposed support frames of the supporting unit; and the two opposed support frames are connected with two terminals of the right-hand and left-hand lead screw, respectively.

For example, each of the support frames is in a closed hollow structure.

For example, the bearing part comprises a groove located in its center, shoulder parts located on both sides of the groove, and a top shoulder part located on a side of one of the shoulder parts and away from the groove.

For example, each of the shoulder parts is provided with a plurality of holes, the holes being connected to a vacuum-pumping device.

For example, the conveying unit comprises conveyor belts respectively corresponding to the support frames, the conveyor belts each having one side in contact with the support frame, and the other side in contact with the liquid crystal display screen to be detected.

For example, a protrusion part is provided on the side of the conveyor belt in contact with the support frame and a flat part is located on both sides of the protrusion part; the flat part comprises a first flat part and a second flat part; the protrusion part is matched to the groove of the support frame; the first flat part and the second flat part are arranged on the shoulder parts of the support frame and in contact with the shoulder parts of the support frame respectively, wherein, the first flat part further abuts against a side surface of the top shoulder part of the support frame.

For example, a single-sided groove is arranged on a side of the second flat part of the conveyor belt opposite to the support frame, and the single-sided groove is configured to support the liquid crystal display screen to be detected.

For example, a width of the single-sided groove is in a range of 0.5 mm to 1.5 mm.

For example, the conveyor belts move at a constant speed along the support frames.

For example, the conveyor belt comprises a double-sided gear steel wire conveyor belt.

For example, a surface material of the double-sided gear steel wire conveyor belt comprises an anti-static material.

For example, the driving unit comprises a motor, the motor being configured to drive the conveying unit to move along the support frames.

For example, the detecting unit comprises an imaging part and a light source; the detecting unit is located above and below the liquid crystal display screen to be detected; the imaging part is to photograph the liquid crystal display screen, and the light source provides lighting for photographing.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical solutions and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
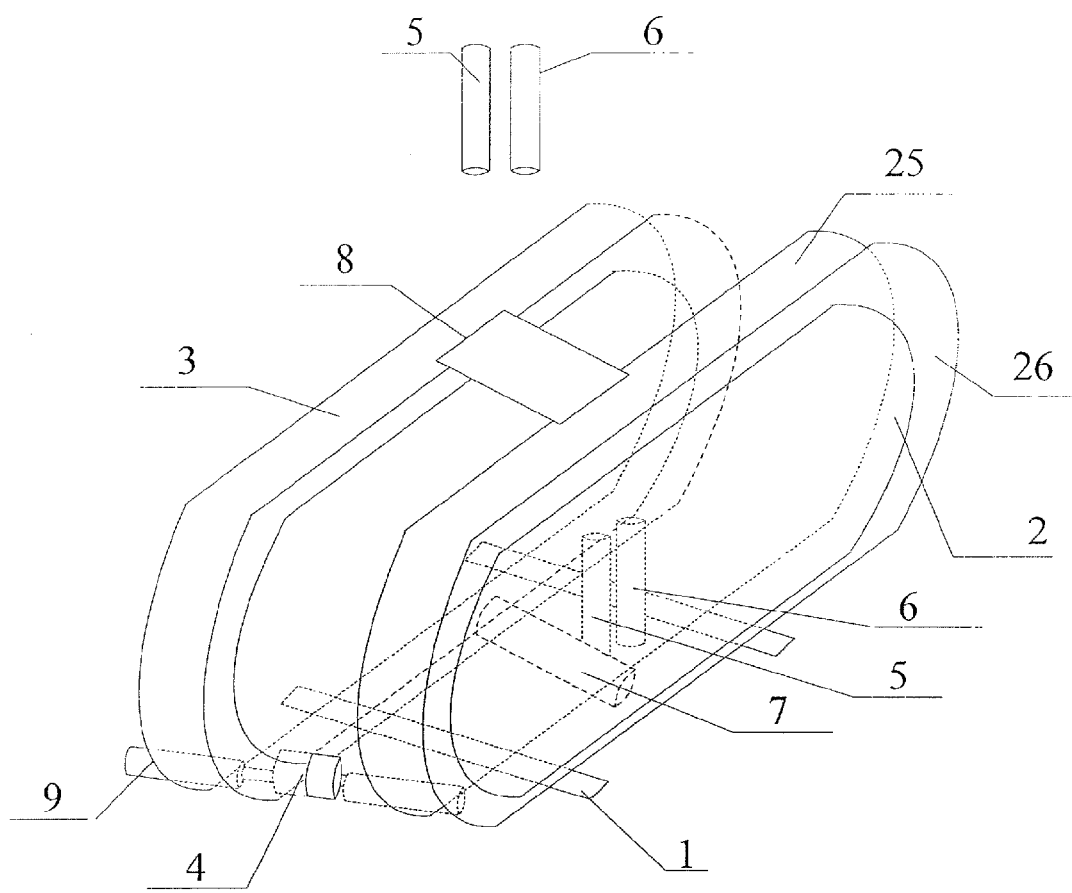
FIG. 1 is a structural schematic diagram of a liquid crystal display screen detecting device in an embodiment of the present invention.
Figure 2:
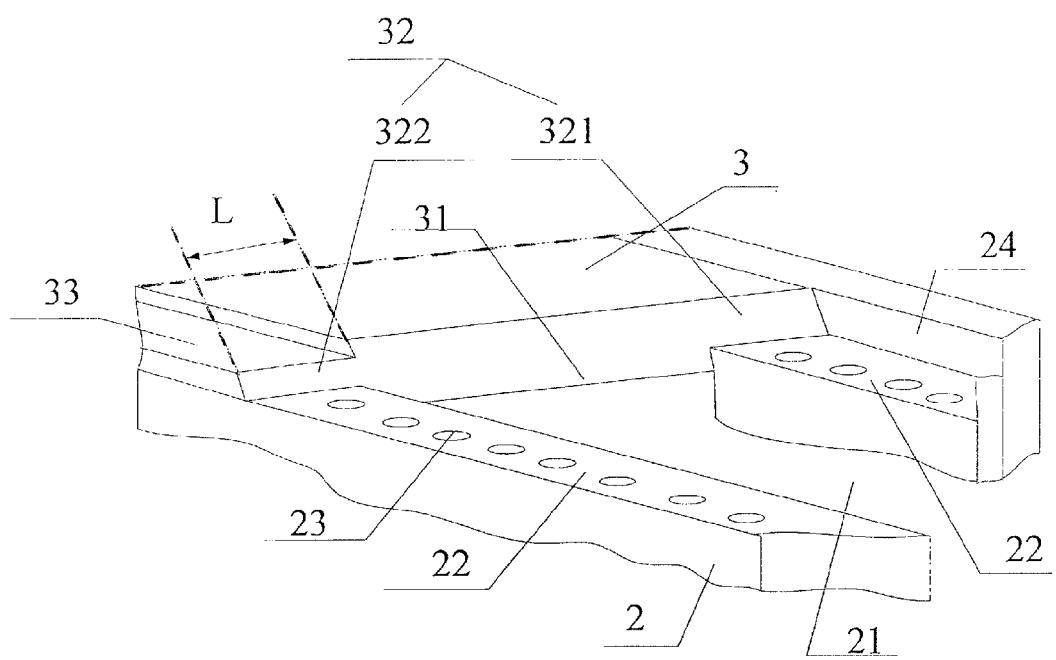
FIG. 2 is a structural schematic diagram of a support frame and a conveying belt in the embodiment of the present invention.

As illustrated in FIG. 1 to FIG. 2, one embodiment of the present invention provides a liquid crystal display screen detecting device, comprising:

a supporting unit having two opposed support frames 2;

a conveying unit configured to carry a liquid crystal display screen 8 to be detected to move on the support frames 2;

a driving unit configured to drive the conveying unit; and a detecting unit configured to detect the liquid crystal display screen 8 to be detected.

The embodiment of the present invention can make the liquid crystal display screen stably operate on the conveying unit by disposing the liquid crystal display screen detecting device in a passage mode, which is applicable to perform appearance detection on the liquid crystal display screen, which, as compared with the operation of mechanical hand in the known techniques, can improve the efficiency of appearance detection, prevent damage to the liquid crystal display screen, reduce the detection blind zone, and perform detection on both sides simultaneously.

For example, the support frame 2 comprises a bearing part 25 and a supporting part 26, the bearing part 25 being configured to move the liquid crystal display screen 8 to be detected, which is carried by the conveying unit, from one terminal to the other terminal of the bearing part 25, and the supporting part 26 being configured to support the bearing part 25.

The bearing parts 25 of the two opposed support frames 2 comprise top terminal faces in contact with the conveying unit, the top terminal faces being disposed on a same horizontal plane. In this way, the liquid crystal display screen will not tilt in a movement. Alternatively, the bearing parts 25 of the two support frames 2 comprise top terminal faces in contact with the conveying unit, the top terminal faces being tilted towards a space between the two support frames 2. In this way, upon the conveying unit and the support frame being in loose contact, the conveying unit can more firmly clamp the unit to be detected, avoiding a case that the liquid crystal display screen falls off.

For example, the supporting parts 26 of the two support frames 2 are tilted towards the space between the two support frames 2. Generally, the supporting part 26 is disposed along a vertical direction, and the supporting part 26 and the bearing part 25 are integrally formed. Upon the supporting part 26 being arranged on a whole surface along a length direction of the bearing part 25, opposed surfaces of the supporting parts 26 between the two support frames 2 are easy to generate light refraction and reflection and so on under irradiation of a light source 6 below the bearing parts 25, resulting in poor imaging of the detecting unit. Such defects can be reduced by tilting the supporting parts 26 towards the space between the two support frames 2.

As illustrated in FIG. 1, for example, the supporting unit is movably fixed on a base plate 1 (the base plate 1 is fixed on the base).

Figure 3:
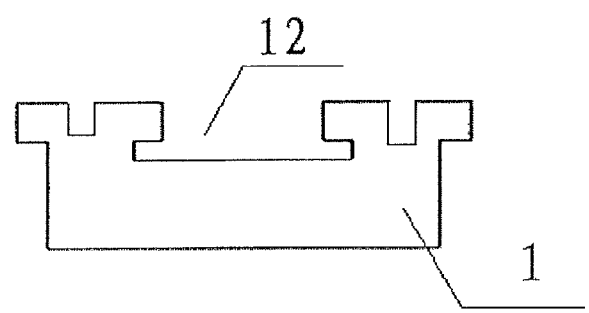
FIG. 3 is a structural cross-sectional view of a base plate in the embodiment of the invention.
Figure 4:
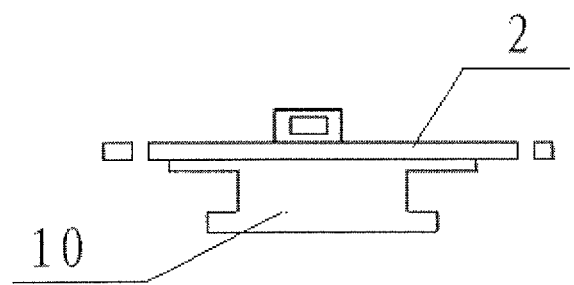
FIG. 4 is a structural cross-sectional view of a support frame bottom in the embodiment of the present invention.
Figure 5:
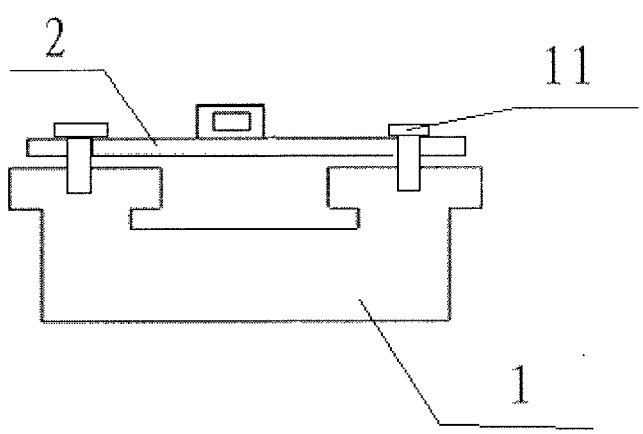
FIG. 5 is a structural cross-sectional view of the support frame bottom and the base plate being connected via a guide rail head in the embodiment of the present invention.

It should be understood that, for example, as illustrated in FIGS. 3-5, the liquid crystal display screen detecting device of the embodiment of the present invention can employ a guide rail structure. For example, the base plate 1 and the supporting unit (the support frame 2) are connected via a guide rail head which is matched to both the base plate 1 and the supporting unit. For example, as illustrated in FIG. 3, a guide rail groove 12 is provided on the base plate 1; as illustrated in FIG. 4, the support frame 2 is firmly connected with a guide rail head 10; as illustrated in FIG. 5, the support frame 2 connected with the guide rail head 10 can be moved along a length direction of the base plate 1, and the supporting unit (the support frame 2) is fixed on the base plate 1 in an appropriate position. For example, the support frame 2 is fixed on the base plate 1 via a bolt 11, as illustrated in FIG. 5.

The distance between the two support frames 2 of the supporting unit is adjustable.

For example, a right-hand and left-hand lead screw 7 is arranged between the two support frames 2 of the supporting unit; the two support frames 2 are connected with two terminals of the right-hand and left-hand lead screw 7, respectively. The distance between the two support frames 2 can be decreased or increased by turning the right-hand and left-hand lead screw 7, to adapt to sizes of liquid crystal display screens of different models.

The structure of the right-hand and left-hand lead screw 7 is known, which will be not repeated here.

Upon the right-hand and left-hand lead screw 7 being adjusted, the base plate 1 and the support frame 2 are in a movable state; after the distance is adjusted, the base plate 1 and the support frame 2 will be fixed, as illustrated in FIG. 5.

It should be understood that, the right-hand and left-hand lead screw 7 described above can be any other mechanism which can adjust the distance between the two support frames 2. For example, the right-hand and left-hand lead screw 7 described above is further provided with a precision scale (for example, a micrometer), to assist in adjusting the distance.

The liquid crystal display screen detecting device of the embodiment of the invention can adapt to sizes of liquid crystal display screens of different models by setting the distance between the two support frames 2 to be adjustable. In addition, there is often a detection blind zone upon performing appearance detection on a liquid crystal display screen, for example, upon photographing beneath the liquid crystal display screen to be detected, a photographic blind zone will be generated in a part of the liquid crystal display screen in contact with the conveying unit, and such a detection blind zone should be avoided as far as possible. The above-mentioned detection blind zone can be minimized by setting the distance between the two support frames 2 to be adjustable.

For example, the support frame 2 is in a closed hollow structure. Upon the two support frames 2 being non-hollow support frames, for example, solid stainless steel support frames, the opposed surfaces of the two support frames 2 generate reflected light under the irradiation of the light source 6, and such reflected light is easy to cause nonuniform brightness upon irradiating onto the liquid crystal display screen, thereby affecting imaging of the detecting unit, and causing poor imaging. On the contrary, upon the support frame 2 being arranged in a closed hollow structure, the reflected light generated by opposed surfaces of the two support frames 2 can be greatly avoided, and poor imaging of the detecting unit can be reduced.

As illustrated in FIG. 2, the bearing part 25 comprises a groove 21 located in its center, shoulder parts 22 located on both sides of the groove 21, and a top shoulder part 24 located on a side of one of the shoulder parts 22 and away from the groove 21. The top shoulder part 24 protrudes from a surface of the shoulder part 22.

For example, the conveying unit comprises conveyor belts 3 respectively corresponding to the respective support frames 2, the conveyor belt 3 having one side in contact with the support frame 2, and the other side in contact with the liquid crystal display screen 8 to be detected.

For example, there is a protrusion part 31 on the side of the conveyor belt 3 in contact with the support frame 2 and a flat part 32 located on both sides of the protrusion part 31; the flat part 32 comprises a first flat part 321 and a second flat part 322; the protrusion part 31 is matched to the groove 21 of the bearing part 25 of the support frame 2; the first flat part 321 and the second flat part 322 are arranged on the shoulder parts 22 of the support frame 2 and in contact with the shoulder parts 22 of the support frame 2 respectively, wherein, the first flat part 321 further abuts against a side surface of the top shoulder part 24 of the support frame 2.

The protrusion part 31 of the conveyor belt 3 is configured to be matched to the groove 21 of the bearing part 25, which can prevent the conveyor belt 3 from shifting in a horizontal direction, and ensure a smooth operation of the conveyor belt 3.

The first flat part 321 of the conveyor belt 3 abuts against the side surface of the top shoulder 24 of the support frame 2, which can also prevent the conveyor belt 3 from shifting in the horizontal direction, and ensure the smooth operation of the conveyor belt 3.

For example, the shoulder part 22 is provided with a plurality of holes 23 connected to a vacuum-pumping device.

Upon the conveyor belt 3 being in contact with the shoulder parts 22 and moving, the holes 23 with vacuum suction applies suction force to the conveyor belt 3, to ensure that the conveyor belt 3 do not swing in the vertical direction. It should be understood that the vacuum-pumping device, for example, can be a vacuum pump, and channels of respective holes 23 are independently or collectively connected with the vacuum pump; and meanwhile the vacuum suction force can be adjusted by the vacuum pump.

For example, a single-sided groove 33 is further arranged on a side of the second flat part 322 of the conveyor belt 3 opposite to the shoulder part 22, and the single-sided groove 33 is configured to support the liquid crystal display screen 8 to be detected.

In other words, respective single-sided grooves 33 of the two conveyor belts 3 are configured to separately support the two opposed sides of the liquid crystal display screen 8 to be detected, so that the liquid crystal display screen to be detected smoothly move on the passage between the two support frames 2.

For example, a width of the single-sided groove 33 is in a range of 0.5 mm to 1.5 mm. As illustrated in FIG. 2, a length L is in a range of 0.5 mm to 1.5 mm. The width of the single-sided groove 33 also can be set according to the specific application conditions, under the prerequisite of ensuring no damage to the liquid crystal display screen, the width of the single-sided groove 33 should be minimized as far as possible to reduce the detection blind zone.

A side of the support frame 2 provided with the top shoulder part 24 is set as a side away from the space between the two opposed support frames, so, upon the conveying belt 3 and the bearing part 25 of the support frame 2 being in loose contact, the top terminal face of the bearing part 25 is tilted towards the space between the two support frames 2, which can ensure that the liquid crystal display screen 8 to be detected is clamped in the single-sided groove 33, and will not get loose within the single-sided groove 33.

For example, the conveyor belts 3 move at a constant speed along the support frames 2. In this way, the liquid crystal display screen to be detected will not fall off due to different speeds of the conveyor belts on the two supporting sides.

For example, the conveyor belt 3 comprises a double-sided gear steel wire conveyor belt. This can ensure no deformation, or even fracture and so on in long-time operation of the conveyor belt 3, so as not to affect the normal operation.

For example, a surface material of the double-sided gear steel wire conveyor belt comprises an anti-static material. The anti-static material, for example, can be a polyethylene material, to prevent damage to the liquid crystal display screen due to electrostatic gathering; and meanwhile it will not affect the bending strength and the wear resistance of the liquid crystal display screen, and it is easy in maintenance.

For example, the driving unit comprises a motor 4, and the motor 4 is configured to drive the conveying belt 3 to move along the support frame 2. As illustrated in FIG. 1, the motor 4 drives the conveyor belt 3 via a roller 9 in contact with the conveyor belt 3. It should be understood that, for example, one or more motors 4 can be used, and the motor 4 can be also arranged in other ways, as long as it can drive the conveyor belt 3.

For example, the detecting unit comprises an imaging part 5 such as a camera, and a light source 6; the detecting unit is located above and below the liquid crystal display screen 8 to be detected; the imaging part 5 is to photograph the liquid crystal display screen, and the light source 6 provides lighting for photographing.

It should be understood that, the quantities, types, and positions of the imaging part 5 and the light source 6 can be selected as specially required, which will not be defined here; meanwhile, the imaging part 5, for example, can be connected with an image processor to process acquired images in real-time and determine detection results, which will be not repeated here.

The above embodiments are only used to illustrate the technical solutions of the present invention, which is not intended to limit the invention; although the present invention have been described in detail with reference to the foregoing embodiments, those of ordinary skill in the art should understand that: they can still make modification to the technical solutions of the above embodiments, or equivalent replacement to some technical features; and these modifications or equivalent replacements do not render the corresponding technical solutions departing from the spirit and scope of respective embodiments of the present invention.

The present application claims priority of Chinese Patent Application No. 201510017341.4 filed on Jan. 13, 2015, the disclosure of which is incorporated herein by reference in its entirety as part of the present application.

What is claimed is:

1. A liquid crystal display screen detecting device, comprising:
a supporting unit having two opposed support frames;
a conveying unit configured to carry a liquid crystal display screen to be detected and move on the support frames;
a driving unit configured to drive the conveying unit; and
a detecting unit configured to detect the liquid crystal display screen to be detected,
wherein each of the support frames comprises a bearing part extending along the support frame, and the bearing parts of the two opposed support frames comprise top terminal faces in contact with the conveying unit, the top terminal faces being tilted towards a space between the two opposed support frames.

2. The liquid crystal display screen detecting device according to claim 1, wherein, each of the support frames further comprises a supporting part being configured to support the bearing part, the bearing part being configured to move the liquid crystal display screen to be detected, which is carried by the conveying unit, from one terminal to the other terminal of the bearing part.

3. The liquid crystal display screen detecting device according to claim 2, wherein, the supporting parts of the two opposed support frames are tilted towards the space between the two opposed support frames.

4. The liquid crystal display screen detecting device according to claim 1, wherein, the supporting unit is movably fixed on a base plate; and a distance between the two opposed support frames of the supporting unit is adjustable.

5. The liquid crystal display screen detecting device according to claim 4, wherein, a right-hand and left-hand lead screw is arranged between the two opposed support frames of the supporting unit; and the two opposed support frames are connected with two terminals of the right-hand and left-hand lead screw, respectively.

6. The liquid crystal display screen detecting device according to claim 1, wherein, each of the support frames is in a closed hollow structure.

7. The liquid crystal display screen detecting device according to claim 2, wherein, the bearing part comprises a groove located in its center, shoulder parts located on both sides of the groove, and a top shoulder part located on a side of one of the shoulder parts and away from the groove.

8. The liquid crystal display screen detecting device according to claim 7, wherein, the top shoulder part protrudes from a surface of the shoulder part.

9. The liquid crystal display screen detecting device according to claim 7, wherein, each of the shoulder parts is provided with a plurality of holes connected to a vacuum-pumping device.

10. The liquid crystal display screen detecting device according to claim 7, wherein, the conveying unit comprises conveyor belts respectively corresponding to the support frames, the conveyor belts each having one side in contact with the support frame, and the other side in contact with the liquid crystal display screen to be detected.

11. The liquid crystal display screen detecting device according to claim 10, wherein, a protrusion part is provided on the side of the conveyor belt in contact with the support frame and a flat part is located on both sides of the protrusion part; the flat part comprises a first flat part and a second flat part;
the protrusion part is matched to the groove of the bearing part of the support frame;
the first flat part and the second flat part are arranged on the shoulder parts of the support frame and in contact with the shoulder parts of the support frame respectively, wherein, the first flat part further abuts against a side surface of the top shoulder part of the support frame.

12. The liquid crystal display screen detecting device according to claim 11, wherein, a single-sided groove is arranged on a side of the second flat part of the conveyor belt opposite to the support frame, and the single-sided groove is configured to support the liquid crystal display screen to be detected.

13. The liquid crystal display screen detecting device according to claim 12, wherein, a width of the single-sided groove is in a range of 0.5 mm to 1.5 mm.

14. The liquid crystal display screen detecting device according to claim 10, wherein, the conveyor belts move at a constant speed along the support frames.

15. The liquid crystal display screen detecting device according to claim 10, wherein, the conveyor belt comprises a double-sided gear steel wire conveyor belt.

16. The liquid crystal display screen detecting device according to claim 15, wherein, a surface material of the double-sided gear steel wire conveyor belt comprises an anti-static material.

17. The liquid crystal display screen detecting device according to claim 1, wherein, the driving unit comprises a motor configured to drive the conveying unit to move along the support frames.

18. The liquid crystal display screen detecting device according to claim 1, wherein, the detecting unit comprises an imaging part and a light source; the detecting unit is located above and below the liquid crystal display screen to be detected; the imaging part is to photograph the liquid crystal display screen, and the light source provides lighting for photographing.

* * * * *